(12) United States Patent
Yeh et al.

(10) Patent No.: US 8,671,891 B2
(45) Date of Patent: Mar. 18, 2014

(54) EXPANDING THE OPERATING ENVELOPE OF ADVANCED COMBUSTION ENIGNES

(75) Inventors: Lisa I. Yeh, Marlton, NJ (US); Jeffrey H. Farenback-Brateman, Cherry Hill, NJ (US); Charles H. Schleyer, Lincoln University, PA (US); Mike T. Noorman, Cinnaminson, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 852 days.

(21) Appl. No.: 12/799,056

(22) Filed: Apr. 16, 2010

(65) Prior Publication Data

US 2010/0326410 A1   Dec. 30, 2010

Related U.S. Application Data

(60) Provisional application No. 61/269,855, filed on Jun. 30, 2009.

(51) Int. Cl.
*F02M 25/00* (2006.01)

(52) U.S. Cl.
USPC ........................................ 123/1 A; 123/198 A

(58) Field of Classification Search
USPC ..................... 123/1 A, 2, 3, 198 A
See application file for complete search history.

(56) References Cited

U.S. PATENT DOCUMENTS 7,487,663 B2 * 2/2009 Sobotowski et al. ........ 73/35.02
8,231,695 B2 * 7/2012 Cunningham et al. .......... 44/433

FOREIGN PATENT DOCUMENTS

JP        2004-91660 A  *  3/2004  .............. C10L 1/08

OTHER PUBLICATIONS

Title: HCCI experiments with gasoline surrogate fuels modeled by a semidetailed chemic kinetic model Authors: Andrae, J. C. G.; Head, R. A. Journal: Combustion and Flame, vol. 156, No. 4, pp. 842-851 Publisher: Elsevier Science Inc. Pub. Date: Apr. 2009 Doc. No. S0010-2180(08)00295-2.*

Yao, et al., "An investigation on the effects of fuel chemistry and engine operating conditions on HCCI engine", *SAE Technical Paper Series* 2008-01-1660, Date = Jun. 2008.

Lu, et al., "Experimental study and chemical analysis of n-heptane homogeneous charge compression ignition combustion with port injection of reaction inhibitors", *Combustion and Flame* 149 (2007) 261-270.

Shibata, et al., "Correlation of Low Temperature Heat Release with Fuel Composition and HCCI Engine Combustion", *SAE Technical Paper Series* 2005-1-0138, Date = Apr. 2005.

* cited by examiner

*Primary Examiner* — Noah Kamen

(74) *Attorney, Agent, or Firm* — David M. Weisberg; Linda M. Scuorzo

(57) ABSTRACT

The invention provides enriched fuels and methods that expand the operating envelope of an advanced combustion engine during operation in an advanced combustion mode (e.g. HCCI mode). Enriched fuels and methods of the invention facilitate efficient combustion over a wide range of engine loads, and the need for EGR, VVT, NVO, rebreathing, or multiple fuel injection is either reduced or eliminated.

14 Claims, 6 Drawing Sheets

EXPANDING THE OPERATING ENVELOPE OF ADVANCED COMBUSTION ENIGINES

This application claims the benefit of U.S. Provisional Application 61/269,855 filed Jun. 30, 2009.

FIELD OF THE INVENTION

The invention provides thermally-efficient and environmentally-friendly fuels and methods for expanding the operating envelope of advanced combustion engines.

BACKGROUND OF THE INVENTION

Internal combustion (IC) engines can operate in a spark ignition (SI) mode, in which a nearly homogeneous air and fuel charge is spark-ignited within a combustion chamber. IC engines may also operate in a compression ignition mode, in which compression of a non-homogeneous air and fuel charge within a combustion chamber ignites the charge. Homogeneous charge compression ignition (HCCI) is a type of compression ignition in which air and fuel are thoroughly mixed in an engine cylinder before compression-initiated self-ignition. Worldwide regulatory initiatives to lower greenhouse gases, vehicular nitrogen oxides ($NO_x$) and particulate matter (PM) emission levels have heightened interest in HCCI, as HCCI can combine the low-$NO_x$ exhaust emissions of gasoline engines with three-way catalysts with the high thermal efficiency associated with diesel engines.

In HCCI, enhanced air-fuel mixing occurs generally through direct fuel injection at an earlier stage than diesel fuel injection. Unlike conventional diesel combustion, HCCI combustion results from spontaneous auto-ignition at multiple points throughout the volume of charge gas. HCCI combustion typically occurs in two stages. A low temperature heat release (LTHR) occurs first, followed by a high temperature heat release (HTHR). LTHR50 is the time at the mid-point of LTHR and HTHR50 is the time at the mid-point of HTHR.

Broadening the main heat release event over more crank angles and reducing the maximum rate of pressure rise increases the operating range of a HCCI engine. Yao, et al., "An investigation on the effects of fuel chemistry and engine operating conditions on HCCI engine", *SAE Technical Paper Series* 2008-01-1660; Lu, et al., "Experimental study and chemical analysis of n-heptane homogeneous charge compression ignition combustion with port injection of reaction inhibitors", *Combustion and Flame* 149 (2007) 261-270.

While these attributes of HCCI are known, it has still proven difficult to operate HCCI engines over a wide range of loads for a number of reasons.

Since HCCI engines rely on auto-ignition, combustion phasing (the timing of auto-ignition) is inherently difficult to control. Combustion occurs very rapidly in HCCI engines and the high rate of pressure increase limits the higher load range of HCCI engines due to mechanical and noise concerns. Low load operation in HCCI mode can also be problematic, as some fuels, especially gasolines, do not readily auto-ignite at low loads. HCCI is also sensitive to fuel composition, Shibata, et al., "Correlation of Low Temperature Heat Release with Fuel Composition and HCCI Engine Combustion", *SAE Technical Paper Series* 2005-01-0138.

Although external exhaust gas recirculation (EGR) and variable valve timing (VVT) help to control the combustion heat release characteristics and rate of pressure rise of HCCI and other IC engines, each of these design options has its detriments.

External EGR leads to a slow response rate since EGR gases must flow through the exhaust and EGR system. External EGR also requires substantial heat dissipation; EGR must often be cooled prior to introduction into the engine. Further, to achieve high load performance with EGR, a larger engine size is needed (due to the displacement of air by EGR), which leads to a loss of efficiency and power. While internal EGR strategies using VVT have faster response rates, some of these valve strategies such as delayed intake valve closure time, lead to decreases in power and efficiency.

Negative Valve Overlap (NVO) attempts to solve HCCI's low load auto-ignition problem by using early exhaust valve closing to trap burnt gases. The trapped gases assist with auto-ignition during a subsequent compression stroke. In another approach called re-breathing, the exhaust valve reopens during the intake stroke to allow burnt gases to reenter the cylinder from the exhaust port. Multiple fuel injection has also been used in an effort to optimize fuel composition across a range of load conditions.

Notwithstanding the aforementioned efforts to optimize HCCI engine combustion phasing, the need continues to exist for practical fuels and methods that will enable IC engines to operate in advanced combustion modes such as the HCCI mode over a broader operating range, with fast response to load and mode changes, while retaining fuel economy and emissions benefits. Ideally, such fuels and methods would operate effectively at high and low engine loads, would achieve improved peak $NO_x$ and PM emission levels, and would enhance thermal efficiency without the mechanical complexities and thermal inefficiencies associated with known engine designs.

SUMMARY OF THE INVENTION

We have discovered methods that expand the operating envelope of advanced combustion engines during operation in an advanced combustion mode by supplying an engine cylinder during operation in an advanced combustion mode (e.g. HCCI mode) with a fuel which is enriched in a to hydrocarbon fraction selected from the group consisting of an aromatic fraction, a cycloparaffin fraction, and an olefinic fraction.

We have also discovered enriched fuels that expand the operating envelope of advanced combustion engines. The enriched fuels comprise fuels that are enriched in a hydrocarbon fraction selected from the group consisting of an aromatic fraction, a cycloparaffin fraction, and an olefinic fraction.

In certain embodiments of the enriched fuels and methods described herein, the enriched fuels are blended with about 5% or more by volume of an alcohol.

The enriched fuels and methods described herein enable efficient combustion over a wide range of engine loads and reduce or eliminate the need for EGR, VVT, NVO, rebreathing, or multiple fuel injection. The enriched fuels and methods described herein exhibit (1) reduced maximum rates of pressure increase during HTHR (2) delayed and broadened HTHR (3) significantly reduced peak $NO_x$ emission levels, and (4) substantially retarded combustion phasing.

Given their improved combustion characteristics, the enriched fuels and methods described herein enable advanced combustion engines to operate in an advanced combustion mode over a broader range of speeds and loads. For example, the enriched fuels and methods described herein should expand an engine's HCCI operating envelope by about 10% to about 30% without encountering unacceptable engine noise or metallurgical stress. Because of their thermal efficiency and low $NO_x$ emission levels, the enriched fuels and methods described herein offer substantial environmental advantages.

In one embodiment, the methods described herein provide a method of expanding an advanced combustion engine's HCCI operating envelope by supplying an engine cylinder during operation in the HCCI mode with a gasoline which is enriched in a hydrocarbon fraction selected from the group consisting of an aromatic fraction, a cycloparaffin fraction, and an olefinic fraction. In still another embodiment, an advanced combustion engine's HCCI operating envelope is expanded by supplying an engine cylinder during operation in the HCCI mode with a gasoline which is enriched in a hydrocarbon selected from the group consisting of cyclopentane, toluene, and diisobutylene.

In another embodiment, the enriched fuels described herein comprise a gasoline which is enriched in a hydrocarbon fraction selected from the group consisting of an aromatic fraction, a cycloparaffin fraction, and an olefinic fraction. For example, the enriched fuels described herein include a gasoline which is enriched in a hydrocarbon selected from the group consisting of cyclopentane, toluene, and diisobutylene.

The enriched fuels and methods described herein achieve efficient combustion over a wide range of engine speeds and loads. Because of delayed ignition and delayed and broadened heat release, combustion occurs over a longer time interval under high load conditions where larger amounts of fuel are fed to the cylinder. Longer combustion duration modulates cylinder pressure at higher engine loads, thereby avoiding undesirable engine vibrations and noise.

These and other aspects of the invention are described further in the following detailed description of the invention.

DETAILED DESCRIPTION OF THE INVENTION

Unless otherwise stated, all percentages disclosed herein are on a volume basis.

Any end point of a range stated herein can be combined with any other end point to form another suitable range.

The following definitions apply unless indicated otherwise.

"An advanced combustion engine" means an IC engine which operates, at least under some speed/load conditions, in either (1) a truly homogeneous HCCI mode (2) a premixed charged compression ignition (PCCI) mode (3) a low-temperature combustion (LTC) mode, or (4) another nontraditional highly mixed combustion mode.

"An alcohol" as used herein includes either one alcohol or a mixture of two or more alcohols. Monohydric aliphatic alcohols are used in certain aspects. Alcohols which contain from 1 to about 10 carbon atoms are used in some aspects, alcohols containing from 1 to 5 carbon atoms are used in some aspects, and alcohols containing from 1 to 4 carbon atoms are used in some aspects. For example, an "alcohol" can be comprised of one or more compounds selected from the group consisting of methanol, ethanol, 1-propanol, 2-propanol, 1-butanol, 2-butanol, 2-methyl-1-propanol, and 2-methyl-2-propanol. Methanol and ethanol are used in certain aspects.

Figure 6:
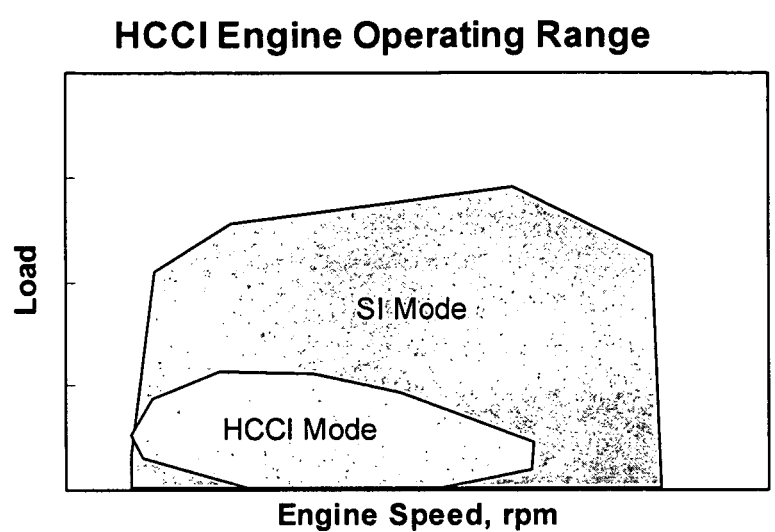
FIG. 6 illustrates an advanced combustion engine's HCCI operating envelope.

An "advanced combustion engine's operating envelope" (e.g. an engine's HCCI operating envelope) is defined by the speed and load range under which the engine is able to operate in the advanced combustion mode, e.g. as depicted for HCCI combustion mode in FIG. 6. An advanced combustion engine's operating envelope is delimited by one or more parameters such as acceptable engine noise, acceptable engine metallurgical stress, and misfire.

An "enriched fuel" means a fuel which is enriched in a hydrocarbon fraction selected from the group consisting of an aromatic fraction, a cycloparaffin fraction, and an olefinic fraction. In an "enriched fuel", the fuel's volumetric percentage of a hydrocarbon fraction selected from the group consisting of an aromatic fraction, a cycloparaffin fraction, and an olefinic fraction is at least around 5% (in some aspects at least around 10%) greater than the volumetric percentage of the corresponding hydrocarbon fractions in a non-enriched fuel. For example, a non-enriched gasoline can comprise around 10-40% by volume aromatics, around 5-15% by volume olefins, and around 2-10% by volume cycloparaffins. If a non-enriched gasoline contained 30% aromatics, then a version of that gasoline which is enriched in aromatics would contain 31.5% or more aromatics (i.e. 30% by volume aromatics plus an additional amount of at least around (0.05) (30%) by volume of aromatics). An "enriched fuel" also includes a fuel which is enriched by a blend of two or more hydrocarbon fractions selected from the group consisting of an aromatic fraction, a cycloparaffin fraction, and an olefinic fraction. The term "about" as applied to composition ranges is used in the disclosure to round up or down from the next significant figure in the range boundary numbers. For example, "about 85% to about 95%" would be down to and including 84.5% and up to 95.5%.

Non-limiting examples of "enriched fuels" include:

(1) an enriched fuel comprising either (a) about 25%-50% or more by volume, in some aspects about 35%-45% or more by volume, in some aspects about 38% or more by volume of aromatics, or (b) about 7%-25% or more by volume, in some aspects about 15%-20% or more by volume, in some aspects about 18% or about 19% or more by volume of olefins, or (c) about 5%-20% or more by volume, in some aspects about 5%-15% or more by volume, in some aspects about 10% or about 11% or more by volume of cycloparaffins;

(2) an enriched gasoline comprising about 30%-65% or more by volume, in some aspects about 45%-60% or more by volume, in some aspects about 48%-58% or more by volume of aromatics, cycloparaffins, and olefins;

(3) an enriched gasoline comprising about 26%-60% or more by volume, in some aspects about 45%-60% or more by volume, in some aspects about 43%-53% or more by volume of aromatics and olefins;

(4) an enriched gasoline comprising about 24%-60% or more by volume, in some aspects about 45%-55% or more by volume, in some aspects about 45% or more by volume of aromatics and cycloparaffins; and (5) an enriched gasoline comprising about 10%-30% or more by volume, in some aspects about 15%-30% or more by volume, in some aspects about 13%-25% or more by volume, and in some aspects about 23% or more by volume of cycloparaffins and olefins.

Non-limiting examples of an enriched fuel also include:

1) an enriched fuel comprising either (a) about 38%-70% by volume, in some aspects about 35%-45% by volume, in some aspects about 35% by volume of aromatics, or (b) about 7%-60% by volume, in some aspects about 19%-60% by volume, in some aspects about 18% by volume of olefins, or (c) about 11%-50% by volume, in some aspects about 5%-15% by volume, in some aspects about 10% by volume of cycloparaffins;

2) an enriched fuel comprising (a) about 25%-50% by volume of aromatics (b) about 7%-25% by volume of olefins, and (c) about 5%-20% by volume of cycloparaffins;

3) an enriched fuel comprising (a) about 35%-45% by volume of aromatics (b) about 7%-20% by volume of olefins, and (c) about 5%-15% by volume of cycloparaffins;

4) an enriched fuel comprising (a) about 35% by volume of aromatics b) about 18% by volume of olefins, and (c) about 10% by volume of cycloparaffins;

5) an enriched fuel comprising about 25%-50% by volume of aromatics and about 7%-25% by volume of olefins;

6) an enriched fuel comprising about 25%-50% by volume of aromatics and about 5%-20% by volume of cycloparaffins;

7) an enriched fuel comprising about 7%-20% by volume of olefins and about 5%-15% by volume of cycloparaffins;

8) an enriched gasoline comprising about 30%-65% by volume of aromatics, cycloparaffins, and olefins;

9) an enriched gasoline comprising about 48%-70% by volume of aromatics, cycloparaffins, and olefins;

10) an enriched gasoline comprising about 58%-68% by volume of aromatics, cycloparaffins, and olefins;

11) an enriched gasoline comprising about 40%-80% by volume of aromatics and olefins;

12) an enriched gasoline comprising about 45%-70% by volume of aromatics and olefins;

13) an enriched gasoline comprising about 53%-65% by volume of aromatics and olefins;

(14) an enriched gasoline comprising about 40%-70% by volume of aromatics and cycloparaffins;

15) an enriched gasoline comprising about 42%-65% by volume of aromatics and cycloparaffins;

16) an enriched gasoline comprising about 45%-55% by volume of aromatics and cycloparaffins;

17) an enriched gasoline comprising about 19%-60% by volume of cycloparaffins and olefins;

18) an enriched gasoline comprising about 20%-50% by volume of cycloparaffins and olefins;

(19) an enriched gasoline comprising about 22%-40% by volume of cycloparaffins and olefins;

(20) an enriched gasoline comprising about 25%-50% by volume of aromatics;

(21) an enriched gasoline comprising about 35%-45% by volume of aromatics;

(22) an enriched gasoline comprising about 35% by volume of aromatics;

(23) an enriched gasoline comprising about 15%-25% by volume of olefins;

(24) an enriched gasoline comprising about 15%-20% by volume of olefins;

(25) an enriched gasoline comprising about 18% by volume of olefins;

(26) an enriched gasoline comprising about 5%-20% by volume of cycloparaffins;

(27) an enriched gasoline comprising about 5%-15% by volume of cycloparaffins;

(28) an enriched gasoline comprising about 10% by volume of cycloparaffins; and

(29) an enriched gasoline comprising (a) about 25%-50% by volume of aromatics (b) about 15%-25% by volume by volume of olefins, and (c) about 5%-20% by volume of cycloparaffins, wherein the enriched gasoline is enriched in a hydrocarbon selected from the group consisting of cyclopentane, toluene, and diisobutylene.

"Expanding an advanced combustion engine's operating envelope during operation in an advanced combustion mode (e.g. expanding an engine's HCCI operating envelope) means increasing the speed and/or load range under which the engine is able to operate in the advanced combustion mode by using an enriched fuel. For example, the methods described herein should expand an engine's HCCI operability range to include loads that are about 10% to about 30% higher than those achieved when the engine uses a non-enriched fuel.

"The engine cylinder optionally contains a small percentage by volume of EGR prior to combustion of the fuel in the cylinder" means that the engine cylinder contains less than about 40% by volume of EGR, and even more in some aspects less than about 20% by volume of EGR.

A "fuel" as described herein includes, but is not limited to, a gasoline, a diesel fuel, kerosene, a jet fuel, a biofuel blend (e.g. biodiesel), a renewable diesel, a Fischer-Tropsch derived fuel, a gasoline-diesel blend, a naphtha, other fuels derived from petroleum or non-petroleum feed stocks, and any combination or blend of the forgoing. Fuels, as described in this disclosure, typically contain additives to improve performance or meet regulations. Examples of additives that might be included in minor amounts in the above mentioned fuels include, but are not limited to oxygenates, detergents, dispersants, lubricity agents, cetane improvers, cold flow improvers, metal deactivators, demulsifiers, defoamants, dyes, corrosion inhibitors and the like.

A non-limiting example of "gasoline" comprises a mixture of hydrocarbons that boil at atmospheric pressure in the range of about 77° F. (25° C.) to about 437° F. (225° C.) and that comprise a major amount of a mixture of paraffins, cycloparaffins, olefins and aromatics, and lesser or minor amounts of additives including oxygenates, detergents, dyes, corrosion inhibitors and the like.

A non-limiting example of a "diesel fuel" is composed of a mixture of $C_9$-$C_{24}$ hydrocarbons that comprise about 50% to about 95% by volume aliphatic hydrocarbons, of which about 0% to about 50% are cycloparaffins, about 0% to about 5% by volume are olefinic hydrocarbons, and about 5% to about 50% by volume are aromatic hydrocarbons, and which boil at between about 280° F. (138° C.) and 750° F. (399° C.).

A non-limiting example of a "kerosene" comprises about 5% to about 50% by volume of an aromatic fraction, about 0% to about 50% by volume of a cycloparaffin fraction, and about 0% to about 5% by volume of an olefinic fraction.

A non-limiting example of a "jet fuel" comprises about 0% to about 25% by volume of an aromatic fraction, about 0% to about 25% by volume of a cycloparaffin fraction, and about 0% to about 5% by volume of an olefinic fraction.

Biodiesel blends (biodiesel blended with diesel fuel) have a composition reflective of blend ratio and the diesel chosen for the blend. The biodiesel itself can be made from vegetable oils such as soy, rape, palm, animal fats, used cooking oil, or other sources.

A renewable diesel is made by hydroprocessing vegetable oil or fatty acid methyl esters to saturate the olefin bonds, remove the oxygen atoms, and leave a highly paraffinic hydrocarbon.

A non-limiting example of a "Fischer-Tropsch" derived fuel comprises about 90%-100% by volume of aliphatic hydrocarbons, about 0% to 1% by volume of olefins, and about 0%-10% by volume of aromatics.

"Hydrocarbon fractions" described herein can include an aromatic fraction, a cycloparaffin fraction, an olefinic fraction, an iso-paraffinic fraction, or a n-paraffinic fraction.

The aromatics fraction described herein can contain methyl aromatics and non-methyl alkyl aromatics. Non-limiting examples of non-methyl alkyl aromatics include molecules such as ethylbenzene, propylbenzene, butylbenzene, alkylnaphthalenes, and the like, in which a single alkyl chain containing two or more carbons is bonded to the aromatic ring. Non-limiting examples of methyl aromatics include aromatic molecules such as toluene, o, m, and p-xylenes, trimethylbenzenes, methyl ethylbenzenes, and the like.

The cycloparaffin fraction described herein consists of cycloalkanes or molecules containing at least one cycloalkane ring. Non-limiting examples of components of the cycloparaffin fraction include cyclohexane, cyclopentane, methylcyclohexanes, methylcyclopentane, dimethylcyclohexanes, dimethylcyclopentanes, ethylcyclohexane, and ethylcyclopentane.

The olefinic fraction described herein can contain linear, branched, and cyclo-olefins. Non-limiting examples of components of the olefinic fraction include butenes, pentenes, isopentenes, hexenes, and diisobutylene.

The iso-paraffinic (branched paraffinic) fraction and n-paraffinic (linear paraffinic) fraction described herein consist, respectively, of branched and straight chain alkanes. Non-limiting examples of iso-paraffinic fraction and n-paraffinic fraction components include n-pentane, n-hexane, n-heptane, 2-methylpentane, and iso-octane.

Fuels described herein in some aspects contain less than 1% by volume of benzene and less than 80 ppm by weight of sulfur.

Fuels described herein can be obtained by the addition of either pure components or blends of pure components or the use of refinery streams having high concentrations of the desired compounds. Those of ordinary skill in the art are able to identify refinery streams that are useful in providing the hydrocarbon fractions of fuels used in the methods described herein. For example, fluid catalytic cracking (FCC) streams contain relatively high levels of aromatics, cycloparaffins, and olefins. Reformate streams contain very high levels of aromatics. Hydrocrackate and steam cracked naphtha contain relatively high levels of cyclopentane.

Non-limiting examples of a blend comprising an enriched fuel and about 5% or more by volume of an alcohol include:

1) a blend comprising about 5% to about 15% by volume of an alcohol and about 85% to about 95% by volume of an enriched fuel;

2) a blend comprising about 15% to about 25% by volume of an alcohol and about 75% to about 85% by volume of an enriched fuel;

3) a blend comprising about 25% to about 35% by volume of an alcohol and about 65% to about 75% by volume of an enriched fuel;

4) a blend comprising about 35% to about 45% by volume of an alcohol and about 55% to about 65% by volume of an enriched fuel;

5) a blend comprising about 45% to about 55% by volume of an alcohol and about 45% to about 55% by volume of an enriched fuel;

6) blend comprising about 55% to about 65% by volume of an alcohol and about 35% to about 45% of an enriched fuel;

7) blend comprising about 65% to about 75% by volume of an alcohol and about 25% to about 35% by volume of an enriched fuel;

(8) a blend comprising about 75% to about 85% by volume of an alcohol and about 15% to about 25% by volume of an enriched fuel; and 9) a blend comprising about 85% to about 95% by volume of an alcohol and about 5% to about 15% by volume of an enriched fuel.

Non-limiting examples of methods which use blends comprising an enriched fuel and about 5% or more by volume of an alcohol include:

(1) methods which use a blend comprising ethanol and an enriched gasoline, wherein the blend is comprised of about 0-5% by volume of ethanol and (a) about 20%-80% by volume of aromatics (for example, about 25%-70% or 35%-80% or 38-70% by volume aromatics) or (b) about 4-60% by volume cycloparaffins (for example, about 5%-50% or 10%-60% or 11-50% by volume cycloparaffins), or (c) about 6-70% by volume olefins (for example, about 7%-60% or 18%-50% or 19-60% by volume olefins), or (d) about 20-90% by volume of aromatics, cycloparaffins, and olefins (for example, about 30-80% or about 48-90% or 58-80% by volume aromatics, cycloparaffins, and olefins), or (e) about 16-85% by volume aromatics and olefins (for example, about 26-75% or 43-85% or 53-75% by volume aromatics and olefins), or (f) about 14-80% aromatics and cycloparaffins (for example, about 24-70% or 40-80% or 45-70% by volume of aromatics and cycloparaffins), or (g) about 5-70% cycloparaffins and olefins (for example about 10-60% or 19-70% or 20-60% by volume of cycloparaffins and olefins);

(2) methods which use a blend comprising ethanol and an enriched gasoline, wherein the blend is comprised of about 5-14% by volume of ethanol and (a) about 15%-75% by volume of aromatics (for example, about 20%-65% or 30%-75% or 32-65% by volume aromatics), or (b) about 3-55% by volume cycloparaffins (for example, about 4%-45% or 5%-55% or 6-45% by volume cycloparaffins), or (c) about 4-65% by volume olefins (for example, about 5%-55% or 8%-65% or 9-55% by volume olefins), or (d) about 17-85% by volume of aromatics, cycloparaffins, and olefins (for example, about 22-75% or about 43-85% or 48-75% by volume aromatics, cycloparaffins, and olefins), or (e) about 14-80% aromatics and olefins (for example, about 19-70% or 38-80% or 43-70% by volume aromatics and olefins), or (f) about 13-75% aromatics and cycloparaffins (for example, about 18-65% or 35-75% or 40-65% by volume of aromatics and cycloparaffins), or (g) about 4-65% cycloparaffins and olefins (for example about 7-55% or 11-65% or 15-55% by volume of cycloparaffins and olefins);

(3) methods which use a blend comprising ethanol and an enriched gasoline, wherein the blend is comprised of about 15-90% by volume of ethanol (for example about 15-85% or about 15-50% or about 20-40% by volume ethanol) and (a) about 10-70% by volume of aromatics (for example, about 15%-60% or 25%-70% or 26-60% by volume aromatics), or (b) about 2-50% by volume cycloparaffins (for example, about 3%-40% or 3%-50% or 4-40% by volume cycloparaffins), or (c) about 3-60% by volume olefins (for example, about 4%-50% or 5%-60% or 6-50% by volume olefins), or (d) about 10-80% by volume of aromatics, cycloparaffins, and olefins (for example, about 15-70% or about 33-80% or 38-70% by volume aromatics, cycloparaffins, and olefins), or (e) about 8-75% by volume aromatics and olefins (for example, about 13-65% or 30-75% or 33-65% by volume aromatics and olefins), or (f) about 8-70% aromatics and cycloparaffins (for example, about 12-60% or 28-70% or 30-60% by volume of aromatics and cycloparaffins), or (g) about 3-60% cycloparaffins and olefins (for example about 5-50% or 8-60% or 10-50% by volume of cycloparaffins and olefins);

(4) methods which use a blend comprising ethanol and an enriched gasoline, wherein the blend is comprised of about 0-5% by volume of ethanol and (a) about 25%-70% by volume of aromatics (for example, about 30%-60% or 35-50% by volume aromatics) or (b) about 5-50% by volume cycloparaffins (for example, about 5%-40% or 10%-30% or 15-25% by volume cycloparaffins), or (c) about 7-60% by volume olefins (for example, about 7%-50% or 18%-50% or 20-40% by volume olefins), or (d) about 30-80% by volume of aromatics, cycloparaffins, and olefins (for example, about 35-80% or about 48-75% or 58-70% by volume aromatics, cycloparaffins, and olefins), or (e) about 26-75% by volume aromatics and olefins (for example, about 35-70% or 45-65% or 53-75% by volume aromatics and olefins), or (1) about 24-70% aromatics and cycloparaffins (for example, about 30-60% or 40-50% or 45-55% by volume of aromatics and cycloparaffins), or (g) about 10-60% cycloparaffins and olefins (for example about 15-55% or 20-50% or 25-40% by volume of cycloparaffins and olefins);

(5) methods which use a blend comprising ethanol and an enriched gasoline, wherein the blend is comprised of about 5-14% by volume of ethanol and (a) about 20%-65% by volume of aromatics (for example, about 20%-60% or 30%-55% or 32-50% by volume aromatics), or (b) about 4-45% by volume cycloparaffins (for example, about 4%-35% or 5%-25% or 6-35% by volume cycloparaffins), or (c) about 5-55% by volume olefins (for example, about 5%-50% or 8%-45% or 9-35% by volume olefins), or (d) about 22-75% by volume of aromatics, cycloparaffins, and olefins (for example, about 22-65% or about 43-65% or 48-75% by volume aromatics, cycloparaffins, and olefins), or (e) about 19-70% aromatics and olefins (for example, about 19-60% or 38-50% or 43-60% by volume aromatics and olefins), or (f) about 18-65% aromatics and cycloparaffins (for example, about 20-65% or 35-55% or 40-65% by volume of aromatics and cycloparaffins), or (g) about 7-55% cycloparaffins and olefins (for example about 7-50% or 11-45% or 15-35% by volume of cycloparaffins and olefins);

(6) methods which use a blend comprising ethanol and an enriched gasoline, wherein the blend is comprised of about 15-90% by volume of ethanol (for example about 15-85% or about 15-50% or about 20-40% by volume ethanol) and (a) about 15-60% by volume of aromatics (for example, about 15%-50% or 25%-50% or 30-40% by volume aromatics), or (b) about 3-40% by volume cycloparaffins (for example, about 3%-30% or 5%-35% or 4-25% by volume cycloparaffins), or (c) about 4-50% by volume olefins (for example, about 4%-40% or 5%-40% or 10-30% by volume olefins), or (d) about 15-70% by volume of aromatics, cycloparaffins, and olefins (for example, about 15-60% or about 33-60% or 38-50% by volume aromatics, cycloparaffins, and olefins), or (e) about 13-65% by volume aromatics and olefins (for example, about 13-55% or 30-45% or 33-45% by volume aromatics and olefins), or (1) about 12-60% aromatics and cycloparaffins (for example, about 15-50% or 28-50% or 30-40% by volume of aromatics and cycloparaffins), or (g) about 5-50% cycloparaffins and olefins (for example about 5-40% or 8-30% or 10-40% by volume of cycloparaffins and olefins);

(7) methods which use a blend comprising ethanol and an enriched gasoline, wherein the blend is comprised of about 0-5% by volume of ethanol and (a) about 35%-80% by volume of aromatics (for example, about 40%-60% or 35-70% by volume aromatics) or (b) about 10-60% by volume cycloparaffins (for example, about 15%-40% or 20%-30% or 15-45% by volume cycloparaffins), or (c) about 18-70% by volume olefins (for example, about 27%-50% or 38%-60% or 25-40% by volume olefins), or (d) about 48-90% by volume of aromatics, cycloparaffins, and olefins (for example, about 55-80% or about 68-85% or 58-70% by volume aromatics, cycloparaffins, and olefins), or (e) about 43-85% by volume aromatics and olefins (for example, about 55-70% or 65-75% or 53-75% by volume aromatics and olefins), or (f) about 40-80% aromatics and cycloparaffins (for example, about 40-60% or 50-70% or 45-75% by volume of aromatics and cycloparaffins), or (g) about 19-70% cycloparaffins and olefins (for example about 25-65% or 30-50% or 25-40% by volume of cycloparaffins and olefins);

(8) methods which use a blend comprising ethanol and an enriched gasoline, wherein the blend is comprised of about 5-14% by volume of ethanol and (a) about 30%-75% by volume of aromatics (for example, about 30%-70% or 40%-65% or 32-50% by volume aromatics), or (b) about 5-55% by volume cycloparaffins (for example, about 10%-45% or 15%-25% or 6-35% by volume cycloparaffins), or (c) about 8-65% by volume olefins (for example, about 10%-55% or 15%-45% or 20-35% by volume olefins), or (d) about 43-85% by volume of aromatics, cycloparaffins, and olefins (for example, about 50-75% or about 50-65% or 55-75% by volume aromatics, cycloparaffins, and olefins), or (e) about 38-80% aromatics and olefins (for example, about 38-60% or 45-75% or 55-70% by volume aromatics and olefins), or (f) about 35-75% aromatics and cycloparaffins (for example, about 40-75% or 45-55% or 50-70% by volume of aromatics and cycloparaffins), or (g) about 11-65% cycloparaffins and olefins (for example about 15-50% or 20-45% or 35-55% by volume of cycloparaffins and olefins);

(9) methods which use a blend comprising ethanol and an enriched gasoline, wherein the blend is comprised of about 15-90% by volume of ethanol (for example about 15-85% or about 15-50% or about 20-40% by volume ethanol) and (a) about 25-70% by volume of aromatics (for example, about 25%-70% or 35%-60% or 40-50% by volume aromatics), or (b) about 3-50% by volume cycloparaffins (for example, about 3%-40% or 5%-35% or 4-25% by volume cycloparaffins), or (c) about 5-60% by volume olefins (for example, about 10%-50% or 15%-45% or 20-30% by volume olefins), or (d) about 33-80% by volume of aromatics, cycloparaffins, and olefins (for example, about 35-70% or about 45-65% or 40-50% by volume aromatics, cycloparaffins, and olefins), or (e) about 30-75% by volume aromatics and olefins (for example, about 30-65% or 40-75% or 45-55% by volume aromatics and olefins), or (f) about 28-70% aromatics and cycloparaffins (for example, about 35-60% or 40-50% or 45-65% by volume of aromatics and cycloparaffins), or (g) about 8-60% cycloparaffins and olefins (for example about 15-40% or 20-50% or 10-40% by volume of cycloparaffins and olefins);

(10) methods which use a blend comprising ethanol and an enriched gasoline, wherein the blend is comprised of about 0-5% by volume of ethanol and (a) about 38%-70% by volume of aromatics (for example, about 40%-60% or 35-70% by volume aromatics) or (b) about 11-50% by volume cycloparaffins (for example, about 15%-40% or 20%-30% or 15-45% by volume cycloparaffins), or (c) about 19-60% by volume olefins (for example, about 27%-50% or 38%-60% or 25-40% by volume olefins), or (d) about 58-80% by volume of aromatics, cycloparaffins, and olefins (for example, about 65-80% or about 60-75% or 58-70% by volume aromatics, cycloparaffins, and olefins), or (e) about 53-75% by volume aromatics and olefins (for example, about 55-75% or 60-70% or 53-75% by volume aromatics and olefins), or (f) about 45-70% aromatics and cycloparaffins (for example, about 50-60% or 55-65% or 55-70% by volume of aromatics and cycloparaffins), or (g) about 20-60% cycloparaffins and olefins (for example about 25-55% or 30-50% or 25-40% by volume of cycloparaffins and olefins);

(11) methods which use a blend comprising ethanol and an enriched gasoline, wherein the blend is comprised of about 5-14% by volume of ethanol and (a) about 32%-65% by volume of aromatics (for example, about 35%-60% or 40%-55% or 40-60% by volume aromatics), or (b) about 6-45% by volume cycloparaffins (for example, about 10%-45% or 15%-25% or 6-35% by volume cycloparaffins), or (c) about 9-55% by volume olefins (for example, about 10%-45% or 15%-45% or 20-35% by volume olefins), or (d) about 48-75% by volume of aromatics, cycloparaffins, and olefins (for example, about 50-75% or about 50-65% or 55-65% by volume aromatics, cycloparaffins, and olefins), or (e) about 43-70% aromatics and olefins (for example, about 50-60% or 55-65% or 45-65% by volume aromatics and olefins), or (f) about 40-65% aromatics and cycloparaffins (for example, about 40-55% or 45-55% or 50-60% by volume of aromatics and cycloparaffins), or (g) about 15-55% cycloparaffins and olefins (for example about 15-50% or 20-45% or 35-55% by volume of cycloparaffins and olefins); and

(12) methods which use a blend comprising ethanol and an enriched gasoline, wherein the blend is comprised of about 15-90% by volume of ethanol (for example about 15-85% or about 15-50% or about 20-40% by volume ethanol) and (a) about 26-60% by volume of aromatics (for example, about 35%-50% or 45%-60% or 40-50% by volume aromatics), or (b) about 4-40% by volume cycloparaffins (for example, about 5%-35% or 10%-30% or 15-25% by volume cycloparaffins), or (c) about 6-50% by volume olefins (for example, about 10%-50% or 15%-45% or 20-30% by volume olefins), or (d) about 38-70% by volume of aromatics, cycloparaffins, and olefins (for example, about 45-70% or about 45-65% or 40-50% by volume aromatics, cycloparaffins, and olefins), or (e) about 33-65% by volume aromatics and olefins (for example, about 40-60% or 50-65% or 45-55% by volume aromatics and olefins), or (1) about 30-60% aromatics and cycloparaffins (for example, about 35-60% or 40-50% or 45-55% by volume of aromatics and cycloparaffins), or (g) about 10-50% cycloparaffins and olefins (for example about 15-40% or 20-50% or 10-40% by volume of cycloparaffins and olefins).

(13) methods which use a blend comprising an alcohol and an enriched gasoline, wherein the blend is comprised of about 5% to about 95% by volume of the alcohol and the enriched gasoline comprises (a) about 25%-50% by volume of aromatics (b) about 15%-25% by volume by volume of olefins, and (c) about 5%-20% by volume of cycloparaffins, and wherein the enriched gasoline is enriched in a hydrocarbon selected from the group consisting of cyclopentane, toluene, and diisobutylene;

(14) methods which use a blend comprising an alcohol and an enriched gasoline, wherein the blend is comprised of about 5% to about 95% by volume of the alcohol and the enriched gasoline is enriched in a hydrocarbon selected from the group consisting of cyclopentane, toluene, and diisobutylene;

(15) methods which use a blend comprising an alcohol and an enriched fuel, wherein the blend is comprised of about 5% to about 95% by volume, in some aspects about 10% to about 50% by volume, in some aspects about 10% to about 30% by volume, in some aspects about 10% to about 15% by volume of an alcohol (in some aspects ethanol) and the enriched fuel is selected from the group consisting of an enriched gasoline, an enriched diesel fuel, an enriched kerosene, an enriched jet fuel, an enriched biofuel blend, an enriched Fischer-Tropsch derived fuel, an enriched gasoline-diesel blend, an enriched naphtha, and mixtures and/or blends thereof;

(16) methods which use a blend comprising an alcohol and an enriched fuel, wherein the blend is comprised of about 5% to about 95% by volume, in some aspects about 10% to about 50% by volume, in some aspects about 10% to about 30% by volume, in some aspects about 10% to about 15% by volume of an alcohol (in some aspects ethanol) and the enriched fuel is selected from the group consisting of an enriched gasoline, an enriched diesel fuel, an enriched kerosene, an enriched jet fuel, an enriched biofuel blend, an enriched Fischer-Tropsch derived fuel, an enriched gasoline-diesel blend, an enriched naphtha, and mixtures and/or blends thereof, wherein the enriched fuel is in some aspects enriched in a hydrocarbon selected from the group consisting of cyclopentane, toluene, and diisobutylene;

(17) methods which use a blend comprising an alcohol and an enriched gasoline, wherein the blend is comprised of about 5% to about 95% by volume, in some aspects about 10% to about 50% by volume, in some aspects about 10% to about 30% by volume, in some aspects about 10% to about 15% by volume of ethanol; and

(18) methods which use a blend comprising an ethanol and an enriched gasoline, wherein the blend is comprised of about 5% to about 95% by volume, in some aspects about 10% to about 50% by volume, in some aspects about 10% to about 30% by volume, in some aspects about 10% to about 15% by volume of ethanol, and wherein the enriched gasoline is in some aspects enriched in a hydrocarbon selected from the group consisting of cyclopentane, toluene, and diisobutylene.

Non-limiting examples of blends comprising an enriched fuel and about 5% or more by volume of an alcohol include:

(1) a blend comprising ethanol and an enriched gasoline, wherein the blend is comprised of about 0-5% by volume of ethanol and (a) about 35%-80% by volume of aromatics (for example, about 40%-60% or 35-70% by volume aromatics) or (b) about 10-60% by volume cycloparaffins (for example, about 15%-40% or 20%-30% or 15-45% by volume cycloparaffins), or (c) about 18-70% by volume olefins (for example, about 27%-50% or 38%-60% or 25-40% by volume olefins), or (d) about 48-90% by volume of aromatics, cycloparaffins, and olefins (for example, about 55-80% or about 68-85% or 58-70% by volume aromatics, cycloparaffins, and olefins), or (e) about 43-85% by volume aromatics and olefins (for example, about 55-70% or 65-75% or 53-75% by volume aromatics and olefins), or (f) about 40-80% aromatics and cycloparaffins (for example, about 40-60% or 50-70% or 45-75% by volume of aromatics and cycloparaffins), or (g) about 19-70% cycloparaffins and olefins (for example about 25-65% or 30-50% or 25-40% by volume of cycloparaffins and olefins);

(2) a blend comprising ethanol and an enriched gasoline, wherein the blend is comprised of about 5-14% by volume of ethanol and (a) about 30%-75% by volume of aromatics (for example, about 30%-70% or 40%-65% or 32-50% by volume aromatics), or (b) about 5-55% by volume cycloparaffins (for example, about 10%-45% or 15%-25% or 6-35% by volume cycloparaffins), or (c) about 8-65% by volume olefins (for example, about 10%-55% or 15%-45% or 20-35% by volume olefins), or (d) about 43-85% by volume of aromatics, cycloparaffins, and olefins (for example, about 50-75% or about 50-65% or 55-75% by volume aromatics, cycloparaffins, and olefins), or (e) about 38-80% aromatics and olefins (for example, about 38-60% or 45-75% or 55-70% by volume aromatics and olefins), or (f) about 35-75% aromatics and cycloparaffins (for example, about 40-75% or 45-55% or 50-70% by volume of aromatics and cycloparaffins), or (g) about 11-65% cycloparaffins and olefins (for example about 15-50% or 20-45% or 35-55% by volume of cycloparaffins and olefins);

(3) a blend comprising ethanol and an enriched gasoline, wherein the blend is comprised of about 15-90% by volume of ethanol (for example about 15-85% or about 15-50% or about 20-40% by volume ethanol) and (a) about 25-70% by volume of aromatics (for example, about 25%-70% or 35%-60% or 40-50% by volume aromatics), or (b) about 3-50% by volume cycloparaffins (for example, about 3%-40% or 5%-35% or 4-25% by volume cycloparaffins), or (c) about 5-60% by volume olefins (for example, about 10%-50% or 15%-45% or 20-30% by volume olefins), or (d) about 33-80% by volume of aromatics, cycloparaffins, and olefins (for example, about 35-70% or about 45-65% or 40-50% by volume aromatics, cycloparaffins, and olefins), or (e) about 30-75% by volume aromatics and olefins (for example, about 30-65% or 40-75% or 45-55% by volume aromatics and olefins), or (f) about 28-70% aromatics and cycloparaffins (for example, about 35-60% or 40-50% or 45-65% by volume of aromatics and cycloparaffins), or (g) about 8-60% cycloparaffins and olefins (for example about 15-40% or 20-50% or 10-40% by volume of cycloparaffins and olefins);

(4) a blend comprising ethanol and an enriched gasoline, wherein the blend is comprised of about 0-5% by volume of ethanol and (a) about 38%-70% by volume of aromatics (for example, about 40%-60% or 35-70% by volume aromatics) or (b) about 11-50% by volume cycloparaffins (for example, about 15%-40% or 20%-30% or 15-45% by volume cycloparaffins), or (c) about 19-60% by volume olefins (for example, about 27%-50% or 38%-60% or 25-40% by volume olefins), or (d) about 58-80% by volume of aromatics, cycloparaffins, and olefins (for example, about 65-80% or about 60-75% or 58-70% by volume aromatics, cycloparaffins, and olefins), or (e) about 53-75% by volume aromatics and olefins (for example, about 55-75% or 60-70% or 53-75% by volume aromatics and olefins), or (f) about 45-70% aromatics and cycloparaffins (for example, about 50-60% or 55-65% or 55-70% by volume of aromatics and cycloparaffins), or (g) about 20-60% cycloparaffins and olefins (for example about 25-55% or 30-50% or 25-40% by volume of cycloparaffins and olefins);

(5) a blend comprising ethanol and an enriched gasoline, wherein the blend is comprised of about 5-14% by volume of ethanol and (a) about 32%-65% by volume of aromatics (for example, about 35%-60% or 40%-55% or 40-60% by volume aromatics), or (b) about 6-45% by volume cycloparaffins (for example, about 10%-45% or 15%-25% or 6-35% by volume cycloparaffins), or (c) about 9-55% by volume olefins (for example, about 10%-45% or 15%-45% or 20-35% by volume olefins), or (d) about 48-75% by volume of aromatics, cycloparaffins, and olefins (for example, about 50-75% or about 50-65% or 55-65% by volume aromatics, cycloparaffins, and olefins), or (e) about 43-70% aromatics and olefins (for example, about 50-60% or 55-65% or 45-65% by volume aromatics and olefins), or (f) about 40-65% aromatics and cycloparaffins (for example, about 40-55% or 45-55% or 50-60% by volume of aromatics and cycloparaffins), or (g) about 15-55% cycloparaffins and olefins (for example about 15-50% or 20-45% or 35-55% by volume of cycloparaffins and olefins); and (6) a blend comprising ethanol and an enriched gasoline, wherein the blend is comprised of about 15-90% by volume of ethanol (for example about 15-85% or about 15-50% or about 20-40% by volume ethanol) and (a) about 26-60% by volume of aromatics (for example, about 35%-50% or 45%-60% or 40-50% by volume aromatics), or (b) about 4-40% by volume cycloparaffins (for example, about 5%-35% or 10%-30% or 15-25% by volume cycloparaffins), or (c) about 6-50% by volume olefins (for example, about 10%-50% or 15%-45% or 20-30% by volume olefins), or (d) about 38-70% by volume of aromatics, cycloparaffins, and olefins (for example, about 45-70% or about 45-65% or 40-50% by volume aromatics, cycloparaffins, and olefins), or (e) about 33-65% by volume aromatics and olefins (for example, about 40-60% or 50-65% or 45-55% by volume aromatics and olefins), or (f) about 30-60% aromatics and cycloparaffins (for example, about 35-60% or 40-50% or 45-55% by volume of aromatics and cycloparaffins), or (g) about 10-50% cycloparaffins and olefins (for example about 15-40% or 20-50% or 10-40% by volume of cycloparaffins and olefins).

(7) a blend comprising an alcohol and an enriched gasoline, wherein the blend is comprised of about 5% to about 95% by volume of the alcohol and the enriched gasoline comprises (a) about 25%-50% by volume of aromatics (b) about 15%-25% by volume by volume of olefins, and (c) about 5%-20% by volume of cycloparaffins, and wherein the enriched gasoline is enriched in a hydrocarbon selected from the group consisting of cyclopentane, toluene, and diisobutylene;

(8) a blend comprising an alcohol and an enriched gasoline, wherein the blend is comprised of about 5% to about 95% by volume of the alcohol and the enriched gasoline is enriched in a hydrocarbon selected from the group consisting of cyclopentane, toluene, and diisobutylene;

(9) a blend comprising an alcohol and an enriched fuel, wherein the blend is comprised of about 5% to about 95% by volume, in some aspects about 10% to about 50% by volume, in some aspects about 10% to about 30% by volume, in some aspects about 10% to about 15% by volume of an alcohol (in some aspects ethanol) and the enriched fuel is selected from the group consisting of an enriched gasoline, an enriched diesel fuel, an enriched kerosene, an enriched jet fuel, an enriched biofuel blend, an enriched Fischer-Tropsch derived fuel, an enriched gasoline-diesel blend, an enriched naphtha, and mixtures and/or blends thereof;

(10) a blend comprising an alcohol and an enriched fuel, wherein the blend is comprised of about 5% to about 95% by volume, in some aspects about 10% to about 50% by volume, in some aspects about 10% to about 30% by volume, in some aspects about 10% to about 15% by volume of an alcohol (in some aspects ethanol) and the enriched fuel is selected from the group consisting of an enriched gasoline, an enriched diesel fuel, an enriched kerosene, an enriched jet fuel, an enriched biofuel blend, an enriched Fischer-Tropsch derived fuel, an enriched gasoline-diesel blend, an enriched naphtha, and mixtures and/or blends thereof, wherein the enriched fuel is in some aspects enriched in a hydrocarbon selected from the group consisting of cyclopentane, toluene, and diisobutylene;

(11) a blend comprising an alcohol and an enriched gasoline, wherein the blend is comprised of about 5% to about 95% by volume, in some aspects about 10% to about 50% by volume, in some aspects about 10% to about 30% by volume, in some aspects about 10% to about 15% by volume of ethanol; and

(12) a blend comprising an ethanol and an enriched gasoline, wherein the blend is comprised of about 5% to about 95% by volume, in some aspects about 10% to about 50% by volume, in some aspects about 10% to about 30% by volume, in some aspects about 10% to about 15% by volume of ethanol, and wherein the enriched gasoline is in some aspects enriched in a hydrocarbon selected from the group consisting of cyclopentane, toluene, and diisobutylene.

As more alcohol (e.g. ethanol) is added to a gasoline, it becomes increasingly difficult to enrich the gasoline with aromatics and olefins while maintaining other gasoline specifications. Therefore, the amounts of aromatics, olefins, and cycloparaffins need to be adjusted as the amount of alcohol is increased. In addition to the blends described above, Tables A-D below also illustrate representative volumetric percentages of aromatics, olefins, and cycloparaffins in blends comprising ethanol and an enriched gasoline.

TABLE A

|  | 0-4% ethanol | 5-14% ethanol | 15-90% ethanol |
| --- | --- | --- | --- |
| Aromatics | 20-80% | 15-75% | 10-70% |
| Cycloparaffins | 4-60% | 3-55% | 2-50% |
| Olefins | 6-70% | 4-65% | 3-60% |
| Aro + cyclo + ole | 20-90% | 17-85% | 10-80% |
| Aro + ole | 16-85% | 14-80% | 8-75% |
| Aro + cyclo | 14-80% | 13-75% | 8-70% |
| Cyclo + ole | 5-70% | 4-65% | 3-60% |

TABLE B

|  | 0-4% ethanol | 5-14% ethanol | 15-90% ethanol |
| --- | --- | --- | --- |
| Aromatics | 25-70% | 20-65% | 15-60% |
| Cycloparaffins | 5-50% | 4-45% | 3-40% |
| Olefins | 7-60% | 5-55% | 4-50% |
| Aro + cyclo + ole | 30-80% | 22-75% | 15-70% |
| Aro + ole | 26-75% | 19-70% | 13-65% |
| Aro + cyclo | 24-70% | 18-65% | 12-60% |
| Cyclo + ole | 10-60% | 7-55% | 5-50% |

TABLE C

|  | 0-4% ethanol | 5-14% ethanol | 15-90% ethanol |
| --- | --- | --- | --- |
| Aromatics | 35-80% | 30-75% | 25-70% |
| Cycloparaffins | 10-60% | 5-55% | 3-50% |
| Olefins | 18-70% | 8-65% | 5-60% |
| Aro + cyclo + ole | 48-90% | 43-85% | 33-80% |
| Aro + ole | 43-85% | 38-80% | 30-75% |
| Aro + cyclo | 40-80% | 35-75% | 28-70% |
| Cyclo + ole | 19-70% | 11-65% | 8-60% |

TABLE D

|  | 0-4% ethanol | 5-14% ethanol | 15-90% ethanol |
| --- | --- | --- | --- |
| Aromatics | 38-70% | 32-65% | 26-60% |
| Cycloparaffins | 11-50% | 6-45% | 4-40% |
| Olefins | 19-60% | 9-55% | 6-50% |
| Aro + cyclo + ole | 58-80% | 48-75% | 38-70% |
| Aro + ole | 53-75% | 43-70% | 33-65% |
| Aro + cyclo | 45-70% | 40-65% | 30-60% |
| Cyclo + ole | 20-60% | 15-55% | 10-50% |

Alcohol-enriched fuel blends can be blended before introduction into an engine cylinder. Alternatively, an alcohol and an enriched fuel may be supplied (e.g., injected) separately into the cylinder to form a blend containing the requisite amounts of alcohol and enriched fuel.

"HCCI" refers to any engine or combustion process in which a substantial majority of the fuel charge is premixed with air or combustion product gases (combustion residuals) to a degree sufficient for compression-induced combustion to occur at multiple locations throughout the premixed charge volume.

A "heat release time interval" means the time interval between LTHR50 and HTHR50.

"Initiating engine operation in a spark ignition (SI) mode" means combusting by spark ignition a fuel or air-fuel charge in an engine cylinder to cold-start the engine. The fuel used to initiate engine operation in a spark ignition (SI) mode may be the same or different than the fuel used when the engine converts to HCCI mode.

"$R_{max}$" is the high temperature heat reaction (HTHR) maximum rate of pressure increase.

In one embodiment, an advanced combustion engine's operating envelope during operation in an advanced combustion mode is expanded by supplying an engine cylinder during operation in the advanced combustion mode with either an enriched fuel or a blend of an enriched fuel and about 5% or more by volume of an alcohol. In this embodiment, during operation: (1) the engine cylinder may contain a small percentage by volume of EGR prior to combustion of the enriched fuel or blend of enriched fuel and alcohol in the cylinder, and (2) the engine's peak $NO_x$ emission level is between about 5% to about 99% lower than the peak $NO_x$ emission level generated when the cylinder is supplied with the corresponding non-enriched fuel.

In another embodiment, an advanced combustion engine's HCCI operating envelope may be expanded by supplying an engine cylinder during operation in the HCCI mode with either an enriched gasoline or a blend of an enriched gasoline and about 5% or more by volume of an alcohol. In this embodiment, during operation in the HCCI mode:

(1) the engine cylinder may contain a small amount of EGR prior to combustion of the enriched gasoline or blend of an enriched gasoline and an alcohol in the cylinder (2) upon combustion the $R_{max}$ value is approximately equal to or lower than the $R_{max}$ value observed when a non-enriched gasoline is combusted in the cylinder in the presence of about 10% to about 40% by volume EGR, and (3) the engine's peak $NO_x$ emission level is between about 5% to about 99% lower than the peak $NO_x$ emission level generated when the cylinder is supplied with the corresponding non-enriched gasoline during operation in the HCCI mode.

In certain embodiments, an advanced combustion engine's HCCI operating envelope is expanded by supplying an engine cylinder during operation in the HCCI mode with either (a) a gasoline which is enriched in a hydrocarbon selected from the group consisting of cyclopentane, toluene, and diisobutylene, or (b) a blend of a gasoline which is enriched in a hydrocarbon selected from the group consisting of cyclopentane, toluene, and diisobutylene and about 5% or more by volume of an alcohol. In this embodiment, during operation in the HCCI mode:

(1) the engine cylinder may contain a small amount of EGR prior to combustion of the enriched gasoline or blend of alcohol and enriched gasoline in the cylinder (2) upon combustion the Rmax value is approximately equal to or lower than the Rmax value observed when a non-enriched gasoline is combusted in the cylinder in the presence of about 10% to about 40% by volume EGR, and (3) the engine's peak NOx emission level is between about 5% to about 99% lower than the peak NOx emission level generated when the cylinder is supplied with the corresponding non-enriched gasoline during operation in the HCCI mode.

In other embodiments, an advanced combustion engine's HCCI operating envelope is expanded by supplying an engine cylinder during operation in the HCCI mode with either (a) a gasoline which is enriched in a hydrocarbon selected from the group consisting of cyclopentane, toluene, and diisobutylene, or (b) a blend of a gasoline which is enriched in a hydrocarbon selected from the group consisting of cyclopentane, toluene, and diisobutylene and about 5% or more by volume of an alcohol. In this embodiment, during operation in the HCCI mode:

(1) the engine cylinder does not contain EGR prior to combustion of the enriched gasoline or blend of alcohol and enriched gasoline in the cylinder (2) upon combustion the Rmax value is approximately equal to the Rmax value observed when a corresponding non-enriched gasoline is combusted in the cylinder in the presence of between about 10% to about 40% by volume EGR, and (3) the engine's peak NOx emission level is between about 5% to about 99% lower than the peak NOx emission level generated when the cylinder is supplied with the corresponding non-enriched gasoline during operation in the HCCI mode.

These and other aspects of the invention are illustrated further in the following examples, which are illustrative and are not limiting.

EXAMPLES

Experimental Apparatus and Methods

The following experimental apparatus and methods were used in the experiments of Examples 1-3 described below.

An ignition quality tester (IQT) was used to study the combustion characteristics of fuels A-L (defined below). The IQT used high pressure and temperature conditions to allow an injected fuel aliquot to combust spontaneously. A pressure sensor monitored pressure rise over time and heat release characteristics were quantified. In this manner, combustion was studied under controlled laboratory conditions and fuel differences were characterized. To better simulate HCCI combustion, the standard IQT operation (ASTM D6890) was modified to better replicate HCCI conditions. This was achieved by modifying the combustion chamber temperature and reducing the fuel quantity. These changes allowed the IQT to predict fuel composition effects in line with HCCI engine observations.

The first derivative of the pressure trace with time describes the heat release characteristics with time in this constant volume combustion bomb. More precisely, the apparent net heat release rate $$\frac{dQ_n}{dt}$$

is given by the formula $$\frac{dQ_n}{dt} = \frac{\gamma}{\gamma-1} p \frac{dV}{dt} + \frac{1}{\gamma-1} V \frac{dp}{dt}$$

where $\gamma$ is the ratio of specific heats, $c_p/c_v$. Heywood, Internal Combustion Engine Fundamentals, page 510. This formula is relevant for a direct injection system such as the IQT. Because there is no volume change in the IQT, the apparent net heat release rate is directly proportional to the change in pressure with time.

The IQT was used to study the impact of EGR by modifying the composition of a charge gas. Gas cylinders were prepared to simulate various levels of EGR by addition of $CO_2$. Gas cylinder compositions are shown in Table I.

TABLE I

Simulated EGR Compositions

| | % EGR | | | |
|---|---|---|---|---|
| | 0% | 20% | 40% | 50% |
| Nitrogen | 79.1 | 79.0 | 77.5 | 76.7 |
| Oxygen | 20.9 | 18.0 | 14.0 | 12.6 |
| CO2 | 0.0 | 3.0 | 8.5 | 10.7 |

The role of fuel composition was studied by blending a set of twelve fuels using chemical components that included n-paraffins, iso-paraffins, aromatics, cycloparaffins, and olefins. A base fuel was blended that contained equal amounts by volume of each component. To study the impact of each component, blends were made wherein the quantity of the test component was twice the quantity of the other components. Table II shows the compositions of the fuels tested.

TABLE II

Fuel Compositions

| Fuel Blends | A | B | C | D | E | F | G | H | I | J | K | L |
|---|---|---|---|---|---|---|---|---|---|---|---|---|
| n-pentane | 9.1 | 16.7 | 8.3 | 8.3 | 8.3 | 8.3 | 8.3 | 8.3 | 8.3 | 8.3 | 8.3 | 8.3 |
| n-hexane | 9.1 | 8.3 | 16.7 | 8.3 | 8.3 | 8.3 | 8.3 | 8.3 | 8.3 | 8.3 | 8.3 | 8.3 |
| n-heptane | 9.1 | 8.3 | 8.3 | 16.7 | 8.3 | 8.3 | 8.3 | 8.3 | 8.3 | 8.3 | 8.3 | 8.3 |
| 2-methylpentane | 9.1 | 8.3 | 8.3 | 8.3 | 16.7 | 8.3 | 8.3 | 8.3 | 8.3 | 8.3 | 8.3 | 8.3 |
| iso-octane | 9.1 | 8.3 | 8.3 | 8.3 | 8.3 | 16.7 | 8.3 | 8.3 | 8.3 | 8.3 | 8.3 | 8.3 |
| toluene | 9.1 | 8.3 | 8.3 | 8.3 | 8.3 | 8.3 | 16.7 | 8.3 | 8.3 | 8.3 | 8.3 | 8.3 |
| m-xylene | 9.1 | 8.3 | 8.3 | 8.3 | 8.3 | 8.3 | 8.3 | 16.7 | 8.3 | 8.3 | 8.3 | 8.3 |
| cyclopentane | 9.1 | 8.3 | 8.3 | 8.3 | 8.3 | 8.3 | 8.3 | 8.3 | 16.7 | 8.3 | 8.3 | 8.3 |
| cyclohexane | 9.1 | 8.3 | 8.3 | 8.3 | 8.3 | 8.3 | 8.3 | 8.3 | 8.3 | 16.7 | 8.3 | 8.3 |
| 4-methyl-1-pentene | 9.1 | 8.3 | 8.3 | 8.3 | 8.3 | 8.3 | 8.3 | 8.3 | 8.3 | 8.3 | 16.7 | 8.3 |
| diisobutylene | 9.1 | 8.3 | 8.3 | 8.3 | 8.3 | 8.3 | 8.3 | 8.3 | 8.3 | 8.3 | 8.3 | 16.7 |

The effect of fuel composition on peak NO$_x$ emission levels generated during combustion in the absence of EGR was also examined.

Example 1

The Effect of EGR Levels on Combustion

Figure 1:
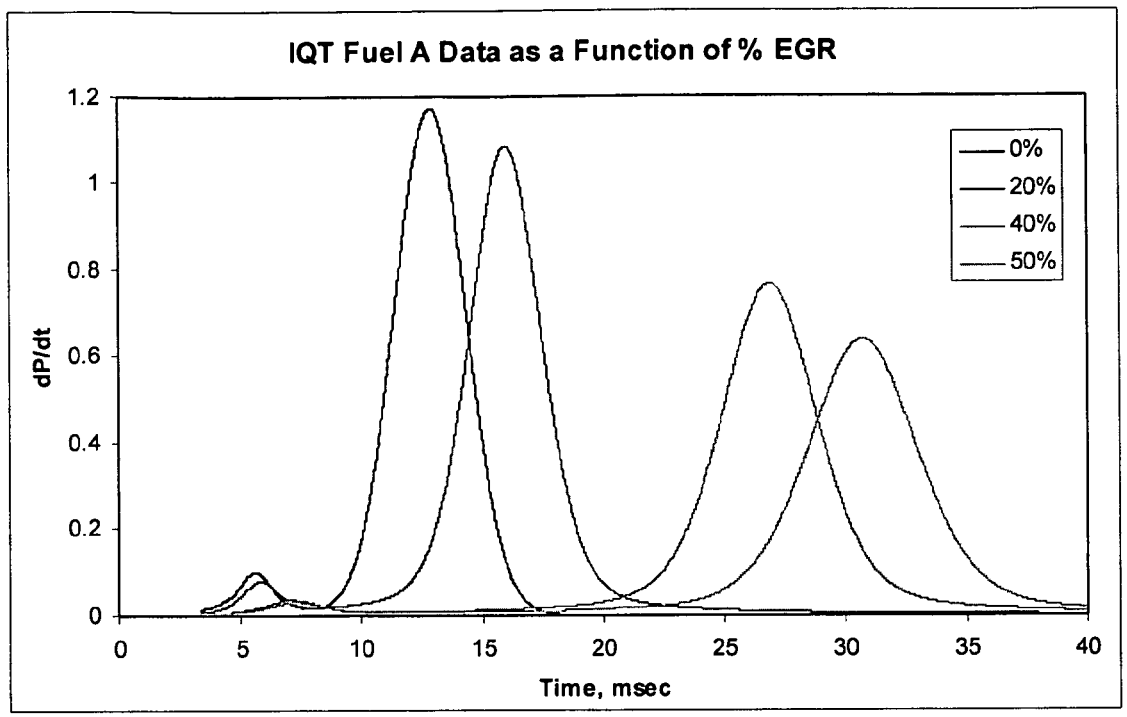
FIG. 1 illustrates the simulated EGR level impact on heat release for base fuel A as determined in the ignition experiment of Example 1.

To examine the impact of EGR levels on combustion, experiments were run in the IQT in which base fuel A was combusted with 0, 20%, 40%, and 50% levels of the simulated EGR compositions specified in Table 1. Results are shown in FIG. 1. It can be seen that as EGR levels increased, the main high temperature heat release (HTHR) occurred later in time, the curves became broader, and the maximum rate of pressure change decreased. The initial smaller heat release peak (LTHR peak) was also delayed in time and became broader as EGR levels increased. Use of EGR therefore had a significant impact on the combustion characteristics of base fuel A.

Example 2

Combustion in the Absence of EGR

Figure 2:
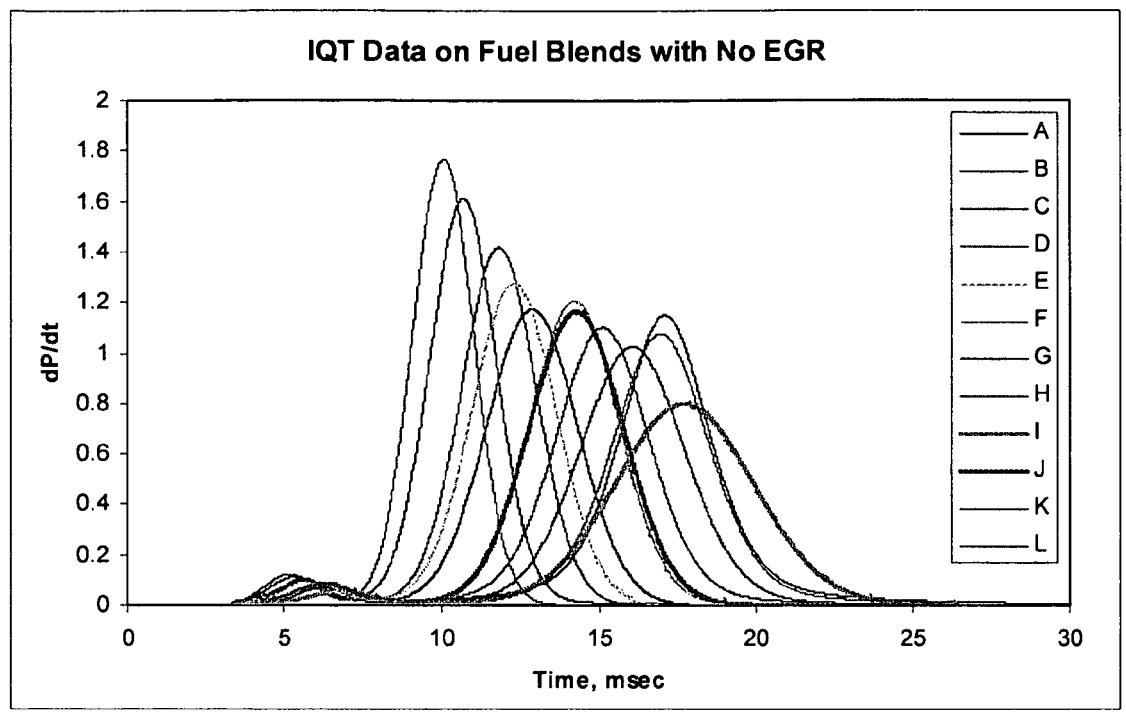
FIG. 2 illustrates the effect of fuel composition on combustion in the absence of EGR as determined in the ignition experiment of Example 2.

To study the impact of fuel composition on combustion characteristics, the twelve fuels described in Table 2 were combusted in the absence of simulated EGR. Results are shown in FIG. 2. The base fuel A curve is near the middle of FIG. 2. The n-paraffin-enriched fuels B, C, and D advanced combustion timing, narrowed the width of the main heat release, and increased the maximum rate of pressure rise. This would be counterproductive for a HCCI engine in many cases. The iso-paraffin-enriched fuels E and F showed less pronounced effects than the n-paraffins, but also tended to decrease the width and increase the maximum rate of pressure rise, albeit only slightly.

The aromatic-enriched fuels G and H, the cycloparaffin-enriched fuels I and J, and the olefin-enriched fuels K and L, on the other hand, tended to delay the main heat release, broadened the heat release, and decreased the maximum rate of pressure rise, characteristics which prove advantageous in advanced combustion systems such as HCCI engines.

The most dramatic impact was seen with the cyclopentane-enriched fuel I. Fuel I was able to significantly broaden the heat release width and decrease the maximum rate of pressure rise. This effect is particularly noteworthy given the relatively low concentration of additional cyclopentane added compared to base fuel A. Other fuels that were particularly effective in delaying the main heat release, broadening the heat release, and lowering the maximum rate of pressure rise were fuels in which small additional amounts of toluene (fuel G) and diisobutylene (fuel L) were added.

Figure 3:
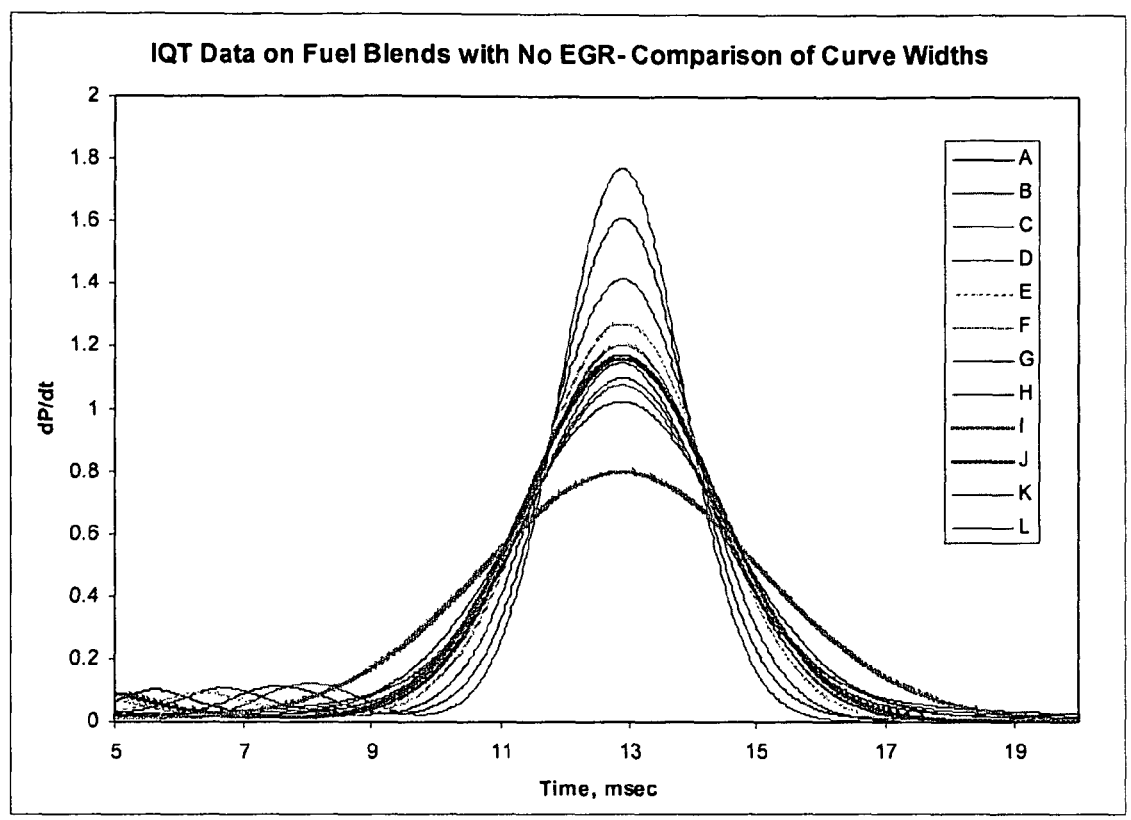
FIG. 3 compares the delayed and broadened LTHR and HTHR and reduced maximum rates of pressure increase for the fuels tested in the experiments of Example 2.

A more direct comparison of curve widths and maximum rate of pressure rise can be seen by overlaying the curves on top of base fuel A as in FIG. 3. From FIG. 3, it is clear that cyclopentane-enriched fuel I has the broadest heat release curve and lowest maximum rate of pressure rise. The impact of aromatics (see for example toluene (fuel G)), and olefins (see for example diisobutylene (fuel L)) can also be seen. It was therefore concluded that aromatics, olefins, and cycloparaffins tend to broaden the width and reduce the maximum pressure rise rate while n-paraffins and iso-paraffins tend to narrow the heat release width and increase the maximum rate of pressure rise.

The EGR Effect of Cyclopentane-Enriched Fuel I

Figure 4:
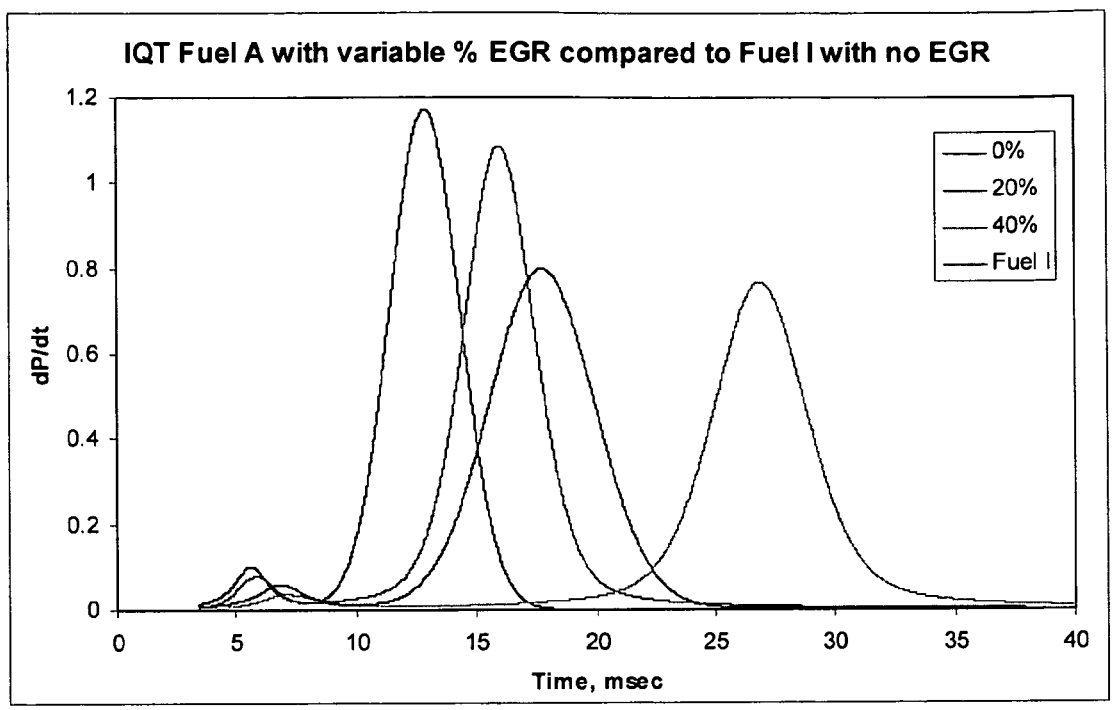
FIG. 4 compares (a) LTHR and HTHR and maximum rates of pressure increase for base fuel A when combusted with 0%, 20%, and 40% EGR with (b) LTHR and HTHR and maximum rate of pressure increase for cyclopentane-enriched fuel I, as determined in the experiments of Examples 1 and 2.

FIG. 4 compares the low and high temperature heat release and maximum rate of pressure increase determined for the combustion of cyclopentane-enriched fuel I in the absence of EGR to the low and high temperature heat release and maximum rate of pressure increase determined for the combustion of fuel A with 0%, 20%, and 40% EGR.

As illustrated in FIG. 4, the broadened heat release width and decreased maximum rate of pressure rise of cyclopentane-enriched fuel I were comparable to the heat release width and maximum rate of pressure rise achieved when fuel A was combusted with 40% simulated EGR. Possibly advantageously, the delayed and dampened low temperature and high temperature heat release and reduced maximum rate of pressure increase exhibited by cyclopentane-enriched fuel I were achieved without much delay in heat release. Adding a small amount of an additional fuel component to achieve the effect of large amounts of EGR provides potential advantages in less thermal losses, less hardware complexity, and potential for faster response times.

The Combined Effects of EGR and Fuel Composition

Figure 5:
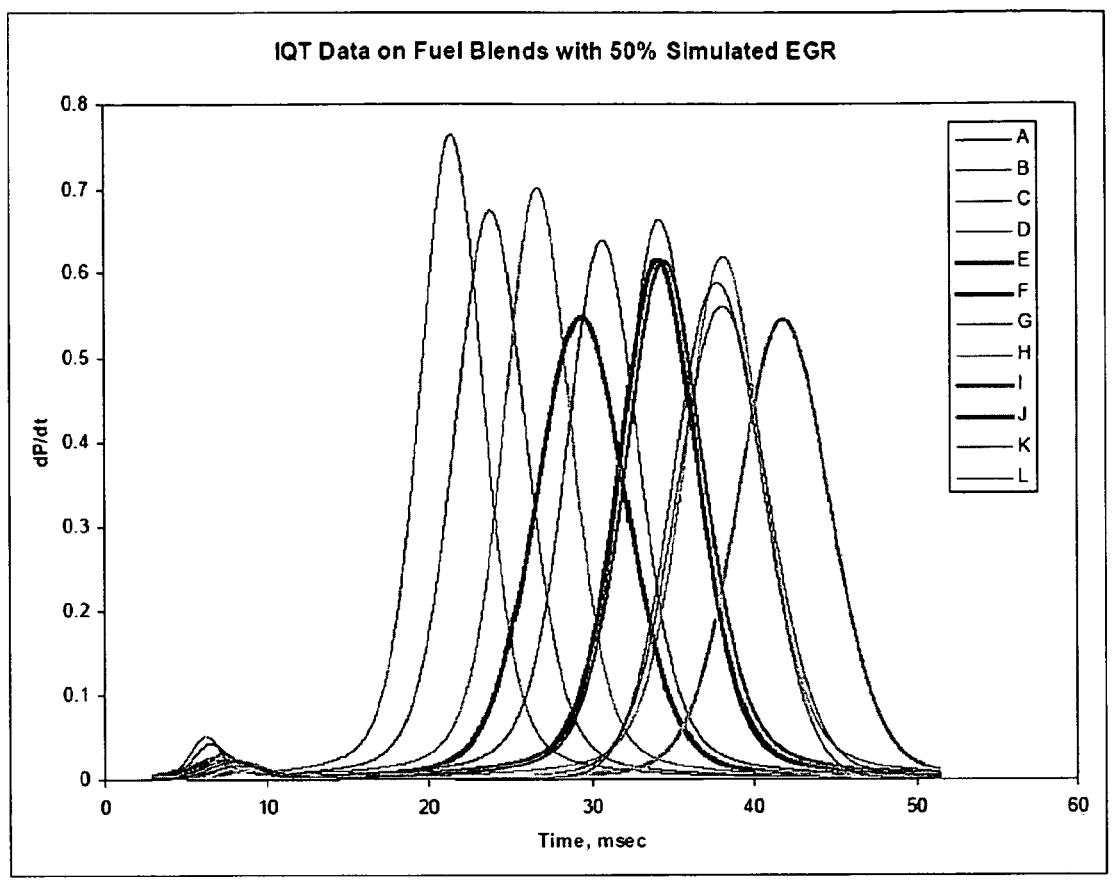
FIG. 5 compares LTHR and HTHR and maximum rates of pressure increase for base fuel A and fuels B-L when combusted with 50% EGR.

FIG. 5 compares the low and high temperature heat release and maximum rate of pressure increase determined for the combustion of fuels A-L in the presence of 50% simulated EGR.

As illustrated in FIG. 5, the n-paraffin-enriched fuels B, C, and D exhibited a narrower width of heat release, an increased maximum rate of pressure rise, and advanced combustion timing. As is the case without EGR, these fuels would not be expected to enable HCCI combustion over base fuel A. Results with the iso-paraffin-enriched fuels E and F were mixed: 2-methylpentane-enriched Fuel E was effective in both broadening the width of heat release and decreasing the maximum rate of pressure rise, even though the combustion timing was advanced when compared to base fuel A. Aromatic-enriched fuels G and H both showed some benefit in lower maximum rate of pressure rise over fuel A with fuel G containing toluene being more effective than fuel H.

Cycloparaffin-enriched fuels I and J both exhibited lower maximum rates of pressure rise and broader heat release widths as was the case without EGR. Again, cyclopentane-enriched fuel I produced the lowest maximum rate of pressure rise and broadest heat release width, thereby showing the best performance of any of the fuels tested. Olefin-enriched fuels K and L gave similar results to the case without EGR. The diisobutylene-enriched fuel L again showed some pressure rise and heat release width benefits over fuel A 4-methyl-1-pentene-enriched fuel K, on the other hand, was less effective.

Based on the foregoing results, it was concluded that combusting an aromatic-enriched, cycloparaffin-enriched, or olefin-enriched fuel in the presence of significant amounts of EGR, is also effective in delaying and dampening low and high temperature heat release and maximum rate of pressure increase and therefore enabling a broader range of HCCI operability. The relative impact, however, is less dramatic than in the absence of EGR.

Example 3

The Effect of Fuel Composition on Peak NO$_x$ Emission Levels

In addition to modifying heat release and pressure rise rates, EGR is also used to lower NO$_x$ emissions. EGR gas has a higher heat capacity than air and this leads to a reduction in combustion temperature. To assess the capability of small alterations in fuel composition to lower NO$_x$ emissions in the absence of EGR, exhaust line peak NO$_x$ levels were measured at 0% EGR in IQT runs for base fuel A, cyclopentane-enriched fuel I, cyclohexane-enriched fuel J, and a decahydronaphthalene (decalin)-enriched fuel M. Results for the average exhaust line peak NO$_x$ levels over 32 injections are shown in Table III.

TABLE III

Averaged Peak NO$x$ Levels in IQT Exhaust

| Fuel | Peak NO$x$, ppm | % NO$x$ reducn |
|---|---|---|
| Fuel A | 135 | 0 |
| Fuel I | 30 | 78 |
| Fuel J | 101 | 26 |
| Fuel M | 328 | −143 |

Based on the results shown in Table III, both cyclopentane and cyclohexane addition were effective in reducing NO$_x$ in the exhaust line. The addition of a small quantity of cyclopentane was remarkably effective and gave a 78% reduction in the averaged peak NO$_x$ measurement. The reduced NO$_x$ emissions are due to a combination of factors including increased air/fuel mixing due to increased ignition delay and a reduction in combustion intensity due to a slower rate of combustion, attributes which prove useful in the operation of HCCI engines.

It is to be understood that the above description is intended for illustrative purposes only, and is not intended to limit the scope of the present invention in any way.

What is claimed is:

1. A method of expanding an advanced combustion engine's operating envelope during operation in an advanced combustion mode, the method comprising supplying an engine cylinder during operation in the advanced combustion mode with a blend selected from the group consisting of:
   (a) a blend comprising about 5% to about 15% by volume of ethanol and about 85% to about 95% by volume of a gasoline enriched in cyclopentane;
   (b) a blend comprising about 15% to about 25% by volume of ethanol and about 75% to about 85% by volume of a gasoline enriched in cyclopentane;
   (c) a blend comprising about 25% to about 35% by volume of ethanol and about 65% to about 75% by volume of a gasoline enriched in cyclopentane;
   (d) a blend comprising about 35% to about 45% by volume of ethanol and about 55% to about 65% by volume of a gasoline enriched in cyclopentane;
   (e) a blend comprising about 45% to about 55% by volume of ethanol and about 45% to about 55% by volume of a gasoline enriched in cyclopentane;
   (f) a blend comprising about 55% to about 65% by volume of ethanol and about 35% to about 45% by volume of a gasoline enriched in cyclopentane;
   (g) a blend comprising about 65% to about 75% by volume of ethanol and about 25% to about 35% by volume of a gasoline enriched in cyclopentane;
   (h) a blend comprising about 75% to about 85% by volume of ethanol and about 15% to about 25% by volume of a gasoline enriched in cyclopentane; and
   (i) a blend comprising about 85% to about 95% by volume of ethanol and about 5% to about 15% by volume of a gasoline enriched in cyclopentane.

2. The method of claim 1, wherein the blend comprises about 10% by volume or more of ethanol and about 45% or more by volume of aromatics, cycloparaffins, and olefins.

3. The method of claim 1, wherein the blend comprises about 10% by volume or more of ethanol and about 40% or more by volume of aromatics and olefins.

4. The method of claim 1, wherein the blend comprises about 10% by volume or more of ethanol and about 40% or more by volume of aromatics and cycloparaffins.

5. The method of claim 1, wherein the blend comprises about 10% by volume or more of ethanol and about 10% or more by volume of cycloparaffins and olefins.

6. The method of claim 1, wherein the blend is selected from the group consisting of blends comprising:
   (1) about 5% by volume of ethanol and (a) about 20%-80% by volume of aromatics, or (b) about 4-60% by volume cycloparaffins, or (c) about 6-70% by volume olefins, or (d) about 20-90% by volume of aromatics, cycloparaffins, and olefins, or (e) about 16-85% by volume aromatics and olefins, or (f) about 14-80% aromatics and cycloparaffins, or (g) about 5-70% cycloparaffins and olefins;
   (2) about 5-14% by volume of ethanol and (a) about 15%-75% by volume of aromatics, or (b) about 3-55% by volume cycloparaffins, or (c) about 4-65% by volume olefins, or (d) about 17-85% by volume of aromatics, cycloparaffins, and olefins, or (e) about 14-80% aromatics and olefins, or (f) about 13-75% aromatics and cycloparaffins, or (g) about 4-65% cycloparaffins and olefins;
   (3) about 15-90% by volume of ethanol and (a) about 10-70% by volume of aromatics, or (b) about 2-50% by volume cycloparaffins, or (c) about 3-60% by volume olefins, or (d) about 10-80% by volume of aromatics, cycloparaffins, and olefins, or (e) about 8-75% by volume aromatics and olefins, or (f) about 8-70% aromatics and cycloparaffins, or (g) about 3-60% cycloparaffins and olefins;
   (4) about 5% by volume of ethanol and (a) about 25%-70% by volume of aromatics, or (b) about 5-50% by volume cycloparaffins, or (c) about 7-60% by volume olefins, or (d) about 30-80% by volume of aromatics, cycloparaffins, and olefins, or (e) about 26-75% by volume aromatics and olefins, or (f) about 24-70% aromatics and cycloparaffins, or (g) about 10-60% cycloparaffins and olefins;
   (5) about 5-14% by volume of ethanol and (a) about 20%-65% by volume of aromatics, or (b) about 4-45% by volume cycloparaffins, or (c) about 5-55% by volume olefins, or (d) about 22-75% by volume of aromatics, cycloparaffins, and olefins, or (e) about 19-70% aromatics and olefins, or (f) about 18-65% aromatics and cycloparaffins, or (g) about 7-55% cycloparaffins and olefins;
   (6) about 15-90% by volume of ethanol and (a) about 15-60% by volume of aromatics, or (b) about 3-40% by volume cycloparaffins,or (c) about 4-50% by volume olefins, or (d) about 15-70% by volume of aromatics, cycloparaffins, and olefins, or (e) about 13-65% by volume aromatics and olefins, or (f) about 12-60% aromatics and cycloparaffins, or (g) about 5-50% cycloparaffins and olefins;
   (7) about 5% by volume of ethanol and (a) about 35%-80% by volume of aromatics, or (b) about 10-60% by volume cycloparaffins, or (c) about 18-70% by volume olefins, or (d) about 48-90% by volume of aromatics, cycloparaffins, and olefins, or (e) about 43-85% by volume aromatics and olefins, or (f) about 40-80% aromatics and cycloparaffins, or (g) about 19-70% cycloparaffins and olefins;
   (8) about 5-14% by volume of ethanol and (a) about 30%-75% by volume of aromatics, or (b) about 5-55% by volume cycloparaffins, or (c) about 8-65% by volume olefins, or (d) about 43-85% by volume of aromatics, cycloparaffins, and olefins, or (e) about 38-80% aromatics and olefins, or (f) about 35-75% aromatics and cycloparaffins, or (g) about 11-65% cycloparaffins and olefins;

(9) about 15-90% by volume of ethanol and (a) about 25-70% by volume of aromatics, or (b) about 3-50% by volume cycloparaffins, or (c) about 5-60% by volume olefins, or (d) about 33-80% by volume of aromatics, cycloparaffins, and olefins, or (e) about 30-75% by volume aromatics and olefins, or (f) about 28-70% aromatics and cycloparaffins, or (g) about 8-60% cycloparaffins and olefins;

(10) about 5% by volume of ethanol and (a) about 38%-70% by volume of aromatics, or (b) about 11-50% by volume cycloparaffins, or (c) about 19-60% by volume olefins, or (d) about 58-80% by volume of aromatics, cycloparaffins, and olefins, or (e) about 53-75% by volume aromatics and olefins, or (f) about 45-70% aromatics and cycloparaffins, or (g) about 20-60% cycloparaffins and olefins;

(11) about 5-14% by volume of ethanol and (a) about 32%-65% by volume of aromatics, or (b) about 6-45% by volume cycloparaffins, or (c) about 9-55% by volume olefins, or (d) about 48-75% by volume of aromatics, cycloparaffins, and olefins, or (e) about 43-70% aromatics and olefins, or (f) about 40-65% aromatics and cycloparaffins, or (g) about 15-55% cycloparaffins and olefins;

(12) about 15-90% by volume of ethanol and (a) about 26-60% by volume of aromatics, or (b) about 4-40% by volume cycloparaffins, or (c) about 6-50% by volume olefins, or (d) about 38-70% by volume of aromatics, cycloparaffins, and olefins, or (e) about 33-65% by volume aromatics and olefins, or (f) about 30-60% aromatics and cycloparaffins, or (g) about 10-50% cycloparaffins and olefins;

(13) about 5% to about 95% by volume of the alcohol and the enriched gasoline comprises (a) about 25%-50% by volume of aromatics (b) about 15%-25% by volume by volume of olefins, and (c) about 5%-20% by volume of cycloparaffins.

7. The method of claim 1, wherein the enriched gasoline comprises about 25% or more by volume of aromatics, about 7% or more by volume of olefins, and/or about 5% or more by volume of cycloparaffins.

8. The method of claim 1, wherein the enriched gasoline is selected from the group consisting of:
(a) comprising about 30% or more by volume of aromatics, cycloparaffins, and olefins;
(b) comprising about 26% or more by volume of aromatics and olefins;
(c) comprising about 24% or more by volume of aromatics and cycloparaffins; and
(d) comprising about 10% or more by volume of cycloparaffins and olefins.

9. The method of claim 1, wherein the enriched gasoline is selected from the group consisting of:
(a) comprising about 35% or more by volume of aromatics,
(b) comprising about 18% or more by volume of olefins; and
(c) comprising about 10% or more by volume of cycloparaffins.

10. The method of claim 1, wherein the enriched gasoline is selected from the group consisting of:
(a) comprising about 48% or more by volume of aromatics, cycloparaffins, and olefins;
(b) comprising about 43% or more by volume of aromatics and olefins;
(c) comprising about 40% or more by volume of aromatics and cycloparaffins; and
(d) comprising about 19% or more by volume of cycloparaffins and olefins.

11. The method of claim 1, wherein the enriched fuel is selected from the group consisting of:
(a) an enriched fuel comprising about 38% or more by volume of aromatics,
(b) an enriched fuel comprising about 19% or more by volume of olefins; and
(c) an enriched fuel comprising about 11% or more by volume of cycloparaffins.

12. The method of claim 1, wherein the enriched gasoline is selected from the group consisting of:
(a) comprising about 58% or more by volume of aromatics, cycloparaffins, and olefins;
(b) comprising about 53% or more by volume of aromatics and olefins;
(c) comprising about 45% or more by volume of aromatics and cycloparaffins; and
(d) comprising about 20% or more by volume of cycloparaffins and olefins.

13. The method of claim 1, wherein the advanced combustion engine operates in either a HCCI mode, a PCCI mode, or a LTC mode.

14. The method of claim 13, wherein the advanced combustion engine operates in a HCCI mode.

* * * * *